(12) United States Patent
Tondreau et al.

(10) Patent No.: US 7,467,375 B2
(45) Date of Patent: Dec. 16, 2008

(54) METHOD AND SYSTEM FOR TRANSFORMING LEGACY SOFTWARE APPLICATIONS INTO MODERN OBJECT-ORIENTED SYSTEMS

(75) Inventors: David Tondreau, Vienna, VA (US); John Mahony, Sterling, VA (US)

(73) Assignee: Computer Associates Think, Inc., Islandia, NY (US)

( * ) Notice: Subject to any disclaimer, the term of this patent is extended or adjusted under 35 U.S.C. 154(b) by 540 days.

(21) Appl. No.: 10/341,132

(22) Filed: Jan. 13, 2003

(65) Prior Publication Data

US 2003/0226132 A1    Dec. 4, 2003

Related U.S. Application Data

(63) Continuation of application No. 10/142,462, filed on May 10, 2002, now abandoned.

(60) Provisional application No. 60/290,203, filed on May 11, 2001.

(51) Int. Cl.
*G06F 9/45* (2006.01)
(52) U.S. Cl. ..................... 717/137
(58) Field of Classification Search ......... 717/136–137, 717/140, 154, 157, 143, 107; 707/102–104
See application file for complete search history.

(56) References Cited

U.S. PATENT DOCUMENTS

| | | | |
|---|---|---|---|
| 5,481,721 A | 1/1996 | Serlet et al. | |
| 5,488,714 A | 1/1996 | Skidmore | |
| 5,530,863 A | 6/1996 | Hiro | |
| 5,551,015 A | 8/1996 | Goettelmann et al. | |
| 5,577,233 A | 11/1996 | Goettelmann et al. | |
| 5,579,223 A | 11/1996 | Raman | |
| 5,586,020 A | 12/1996 | Isozaki | |
| 5,586,329 A | 12/1996 | Knudsen et al. | |
| 5,586,330 A | 12/1996 | Knudsen et al. | |
| 5,626,569 A * | 5/1997 | Holtermann et al. | 717/140 |
| 5,678,039 A | 10/1997 | Hinks et al. | |
| 5,682,158 A | 10/1997 | Edberg et al. | |
| 5,708,510 A | 1/1998 | Maruyama et al. | |
| 5,724,590 A | 3/1998 | Goettelmann et al. | |
| 5,758,032 A | 5/1998 | Sanders | |
| 5,764,170 A | 6/1998 | Nabeta et al. | |
| 5,765,131 A | 6/1998 | Stentiford et al. | |
| 5,768,564 A | 6/1998 | Andrews et al. | |

(Continued)

OTHER PUBLICATIONS

Maarit Harsu, "Identifying Object-oriented features from procedural software", google, 2000.*

(Continued)

*Primary Examiner*—Wei Y Zhen
*Assistant Examiner*—Anna Deng
(74) *Attorney, Agent, or Firm*—Baker Botts L.L.P.

(57) ABSTRACT

A system and method for transforming a procedural program having procedural language code into an object-oriented program, comprises scanning the procedural language code and creating a map based on the scanned procedural language code, storing the scanned procedural language code as intermediate code, processing at least a segment of the procedural language code using the map, creating a first data structure using the processed segment, modifying the intermediate code based on the first data structure and generating an object-oriented program having an object class based on the modified intermediate code.

9 Claims, 6 Drawing Sheets

U.S. PATENT DOCUMENTS

| | | | |
|---|---|---|---|
| 5,805,893 | A | 9/1998 | Sproul et al. |
| 5,805,895 | A | 9/1998 | Breternitz, Jr. et al. |
| 5,819,067 | A | 10/1998 | Lynch |
| 5,842,204 | A | 11/1998 | Andrews et al. |
| 5,870,039 | A | 2/1999 | Imanishi et al. |
| 5,898,394 | A | 4/1999 | Kobayashi et al. |
| 5,956,510 | A * | 9/1999 | Nicholas ............ 717/137 |
| 5,974,256 | A | 10/1999 | Matthews et al. |
| 5,974,372 | A | 10/1999 | Barnes et al. |
| 5,983,020 | A | 11/1999 | Sweeney et al. |
| 6,002,874 | A * | 12/1999 | Bahrs et al. ............ 717/157 |
| 6,016,396 | A | 1/2000 | Mochizuki |
| 6,031,993 | A * | 2/2000 | Andrews et al. ............ 717/143 |
| 6,086,622 | A | 7/2000 | Abe et al. |
| 6,118,447 | A | 9/2000 | Harel |
| 6,151,702 | A | 11/2000 | Overturf et al. |
| 6,158,047 | A | 12/2000 | Le et al. |
| 6,163,882 | A | 12/2000 | Masuyama et al. |
| 6,164,841 | A | 12/2000 | Mattson, Jr. et al. |
| 6,182,026 | B1 | 1/2001 | Tillmann et al. |
| 6,195,792 | B1 | 2/2001 | Turnbull et al. |
| 6,453,312 | B1 * | 9/2002 | Goiffon et al. ............ 707/3 |
| 6,519,605 | B1 * | 2/2003 | Gilgen et al. ............ 707/103 R |
| 6,523,171 | B1 * | 2/2003 | Dupuy et al. ............ 717/136 |
| 6,654,950 | B1 * | 11/2003 | Barnishan ............ 717/136 |
| 7,065,750 | B2 * | 6/2006 | Babaian et al. ............ 717/136 |
| 7,181,731 | B2 * | 2/2007 | Pace et al. ............ 717/136 |
| 2005/0273772 | A1 * | 12/2005 | Matsakis et al. ............ 717/136 |

OTHER PUBLICATIONS

Gall et al. "Program Transformation to enhance the Reuse Potential of Procedural Software", 1994, ACM, pp. 99-104.*

Gall et al. "Architectural Transformation of Legacy Systems", Apr. 1995, pp. 1-17, http://citeseer.ist.psu.edu/cache/papers/cs/2606/http:zSzzSzwww.infosys.tuwien.ac.atzSzStaffzSzhgzSzicse-ws.pdf/gall95architectural.pdf.*

Harsu, Maarit, "A survey of Object Identification in Software Re-Engineering" Apr. 1998, pp. 1-29, http://citeseer.ist.psu.edu/cache/papers/cs/3492/ftp:zSzzSzcs.uta.fizSzpubzSzreportszSzA-1998-6.pdf/harsu98survey.pdf.*

Hermenegildo et al. "Incremental analysis of constraint logic programs", Mar. 2000, ACM, TOPLAS vol. 22, Issue 2, p. 187-223.*

Liu et al. "The Building Blocks for Specifying Communication Behavior of Complex Objects: An Activity-Driven Approach", Jun. 1996, ACM, TODS vol. 21, Issue 2, pp. 157-207.*

Ivar Jacabson and Frederik Lindstrom, "Re-engineering of old systems to an object-oriented architecture", Oct. 1991, OOPSLA '91, pp. 340-350.

Harry M. Sneed, "Migration of Procedurally Oriented COBOL Programs in an Object-Oriented Architecture", Nov. 1992, IEEE, pp. 105-116.

Harry M. Sneed, "Reverse Engineering As A Bridge To Case", IEEE, Jul. 1995, pp. 304-317.

Nestor A. Gonzalez et al., "Migrating Software from Procedural to Object-Oriented Architecture", IEEE, Oct. 1998, pp. 4872-4877.

Paulo Cesar Masiero and Rosana T. Vaccare Braga, "Legacy Systems Reengineering Using Software Patterns", IEEE, Nov. 1999, pp. 160-169.

* cited by examiner

Figure 6

METHOD AND SYSTEM FOR TRANSFORMING LEGACY SOFTWARE APPLICATIONS INTO MODERN OBJECT-ORIENTED SYSTEMS

CROSS-REFERENCE TO RELATED APPLICATIONS

This application is a Rule 1.53(b) continuation of application Ser. No. 10/142,462, filed May 10, 2002, now abandoned and claims the benefit of U.S. provisional application Ser. No. 60/290,203, filed May 11, 2001 and entitled "METHOD AND SYSTEM FOR TRANSFORMING LEGACY SOFTWARE APPLICATIONS INTO MODERN OBJECT-ORIENTED SYSTEMS", which is incorporated in its entirety herein by reference.

TECHNICAL FIELD

The present disclosure relates to the transformation of computer programs. More specifically, the present disclosure relates to a method and system for transforming legacy software applications into modem object-oriented systems.

DESCRIPTION OF THE RELATED ART

Many technologies and methodologies exist for converting software applications from one programming language to another. But the language in which a software application is written is only one aspect of its makeup. A software application is a complex system having many parts.

The "code" is the portion of the software application that is written in a programming language and contains the instructions for what the software application is to do under various circumstances. In the early days of computers, software applications were written using assembly language. An assembly language program is converted by an application called an assembler into machine language which is executed by the central processing unit of a computer. Assembly language operations are very low level and can make writing applications difficult. As computer technology evolved, alternative "higher level" languages were developed which allowed the programmer to more easily create software which performed complex tasks. A special software application called a compiler was developed which would reduce higher level languages to machine language where it could be executed by the computer. Higher level languages allowed a programmer to organize code into blocks of code called routines or procedures, which could be used repeatedly, if necessary.

Software applications also need to be able to manage information. Software development tools thus provide for the ability to declare data structures. Data structures provide a way to store data in memory in an organized and identifiable fashion so the data can be acted upon by the code. The code contains instructions for acting on the data structures and is grouped in segments called routines. In early software development tools, the data structures and routines were defined separately. In order for any routine to operate on data, the data had to be passed to the routine as a parameter. The approach of writing software that calls routines and passes parameters is commonly referred to as "procedural programming." A more modern approach is the "object oriented" or OO model. The OO model is dramatically different from the procedural model.

In the OO model, data structures and code routines may be grouped into a single, independent data structure called a "class." A class is a template definition of the routines, called methods, and data structures belonging to a particular kind of object. The class defines the common properties of the member objects. OO programs may be easily created and modified due to the modular, reusable code structure.

OO programming also allows for many other advantageous characteristics such as inheritance. Inheritance allows users to create a new object first by specifying another object as its parent class (or "super class"). The newly created object immediately acquires all of the capabilities of its parent. However, users can customize the new class's behavior under any circumstance.

A "user interface" is a portion of the application that allows an individual to interact with the software application. In many cases, the user interface is created using "forms." A form specifies the appearance of the "fields" and "trim" that are presented to the user on a display. Fields are individual areas where a user can enter data. Trim is fixed information such as labels, which instruct the user what to enter in different fields or provide some other purpose in the application. Often these forms are not implemented using code. Rather, there is a "forms editor" which is part of a software development environment that allows a programmer to interactively build the forms. The definition of the form is stored in a repository and the development environment and provides for the display of the forms when the application is executed.

Software development tools of the 1970's and 1980's used a "character based" user interface. Typically, this user interface was restricted to displaying a form of 80 characters per line by 24 lines. These tools often used a $25^{th}$ line on a terminal to display the commands associated with the active form. More modern tools allow the implementation of forms which use a graphical user interface (GUI). The GUI allows for the implementation of more complex forms with a greater number and variety of user controls.

Together, the code and the forms create an application that can be executed to perform a task. The portion of the program that manages the user interface is called "presentation logic." This includes the code statements that trap user input and start program actions, prompt the user for additional information or otherwise make changes to the display. The remainder of the code is called "business logic." The business logic includes the workflows, database access, transactions and other actions that are a consequence of the user's commands. It is quite common for business logic and presentation logic to be intertwined.

A database management system (DBMS) is a collection of programs that can store, modify, and extract information from a database. Requests for information from a database are made in the form of a query, which is a stylized question. The set of rules for constructing queries is known as a query language. Different DBMS's support different query languages, although there is a semi-standardized query language called SQL (structured query language).

The information stored in a database can be presented in a variety of formats. Most DBMS's include a report writer program that enables data to be output in the form of a report. The report writer program, also called a report generator, is a part of a database management system that extracts information from one or more files and presents the information in a specified format. Report writers allow selection of records that meet certain conditions and display selected fields in rows and columns. Data may be formatted into pie charts, bar charts, and other diagrams. Once a report format is created, the format specifications may be saved in a file and reused for future presentations.

Relational database management systems (RDBMS) are a type of database management system (DBMS) that stores data in the form of related tables. Relational databases may require few assumptions about how data is related or how it will be extracted from the database. As a result, the same database may be viewed in many different ways. In relational database management systems, information is stored in the form of tables, for example, a spreadsheet, which refer to data arranged in rows and columns. One desirable feature of relational systems is that a single database can be spread across several tables.

A software application is implemented using some kind of "architecture." The architecture describes the basic infrastructure of the application. One aspect of architecture relates to the number of computers that are involved. A single-tier software application is one in which all applications and/or systems run on a single computer. This includes any external calls the software needs to make to other software applications. For instance, a software application may "call" a database management system in order to retrieve or update data. In the single-tier model, both the software application and the database management system would be running on a single computer. The user interface may be displayed on a "dumb terminal" which is a device capable only of displaying a form, allowing the user to enter information, and returning that input to the "host" computer.

A client/server application, or two-tiered software application, is one in which the software application is running on one computer (the client) and makes external calls to other software applications running on another computer (the server) via a network connection.

An even more recent architectural innovation is the N-tiered application. In the N-tiered model, only part of the software application is run on the client workstation. This is usually an intelligent user interface (or thin client). When a specific task needs to be performed, the client locates an "application server" containing the required business logic and the work is actually performed on the computer running the application server. The application server may, in turn, need to contact another computer, such as a database server, in order to complete the processing requested by this client. As this chain of events can ultimately involve an unlimited number of computers, the model is called the N-tiered model.

One challenge facing many organizations today is that they have invested large sums of money and time developing software applications which use character interfaces, are procedural in nature and are implemented in a single-tier model. These applications are commonly called "legacy" applications. Supporting and enhancing these applications is a major challenge because developers are no longer being taught the technologies in which they were created. In addition, the current world of the Internet and c-commerce requires systems that exploit the graphical user interfaces, are object-orientated in nature and are implemented using a N-tier model. No technologies have yet been created which allow an organization to transform their existing legacy applications into modern, object-orientated, N-tier applications that use a graphical user interface. As a result, the organization must undertake a time consuming and expensive process to completely redesign and rewrite the application using modern tools.

The method and system according to the present application solves these and other problems. For example, the method and systems according to the present disclosure are capable of "transforming" a legacy software application into a GUI based software application. The transformation contemplated by the present disclosure includes converting and enhancing the individual aspects of the system. In a single process, the character based user interface of the legacy software application can be transformed into a GUI, the code and data structures are integrated, reconfigured and regenerated as appropriately formed object classes, and enhancements and additions can be made to the legacy software application to enable it to operate as either a client/server or N-tier system.

SUMMARY

The present disclosure relates to a method for transforming a procedural program having procedural language code into an object-oriented program, comprises scanning the procedural language code and creating a map based on the scanned procedural language code, storing the scanned procedural language code as intermediate code, processing at least a segment of the procedural language code using the map, creating a first data structure using the processed segment, modifying the intermediate code based on the first data structure, and generating an object-oriented program having an object class based on the modified intermediate code. The method may also comprise suspending the step of processing a segment of the procedural language code when a predetermined segment of the procedural language code is detected, and modifying an other intermediate code based on the predetermined segment. The method may also comprise creating a second data structure based on the procedural language and the second data structure may be a hierarchical tree having a node identifying a property of a statement of the procedural programming language. The step of creating a first data structure may include locating a node in the second data structure based on the processed segment, traversing the nodes second data structure to a root node, and including the contents of the traversed nodes in the first data structure.

The present disclosure also relates to a storage medium including computer executable code for transforming a procedural program having procedural language code into an object-oriented program, comprising code for scanning the procedural language code and creating a map based on the scanned procedural language code, code for storing the scanned procedural language code as intermediate code, code for processing at least a segment of the procedural language code using the map, code creating a first data structure using the processed segment, code for modifying the intermediate code based on the first data structure, and code for generating an object-oriented program having an object class based on the modified intermediate code. The storage medium may also comprise code for suspending processing a segment of the procedural language code when a predetermined segment of the procedural language code is detected, and code for modifying an other intermediate code based on the predetermined segment. The storage medium may also comprise code for creating a second data structure based on the procedural language, and the second data structure may be a hierarchical tree having a node identifying a property of a statement of the procedural programming language. The code for creating a first data structure may include code for locating a node in the second data structure based on the processed segment, code for traversing the nodes second data structure to a root node, and code for including the contents of the traversed nodes in the first data structure.

The present disclosure also relates to a computer data signal embodied in a transmission medium and including computer executable instructions for transforming a procedural program having procedural language code into an object-oriented program, comprising a data signal portion for scanning the procedural language code and creating a map based on the scanned procedural language code, a data signal portion for storing the scanned procedural language code as intermediate code, a data signal portion for processing at least a segment of the procedural language code using the map, a data signal portion for creating a first data structure using the processed segment, a data signal portion for modifying the intermediate code based on the first data structure, and a data signal portion for generating an object-oriented program having an object class based on the modified intermediate code. The computer data signal may also comprise a data signal portion for suspending processing a segment of the procedural language code when a predetermined segment of the procedural language code is detected, and a data signal portion for modifying an other intermediate code based on the predetermined segment. The computer data signal may also comprise a data signal portion for creating a second data structure based on the procedural language, and the second data structure may be a hierarchical tree having a node identifying a property of a statement of the procedural programming language. The data signal portion for creating a first data structure may include a data signal portion for locating a node in the second data structure based on the processed segment, a data signal portion for traversing the nodes second data structure to a root node, and a data signal portion for including the contents of the traversed nodes in the first data structure.

The present disclosure also relates to a method for transforming a procedural program having procedural language code into an object-oriented program, comprising: scanning the procedural language code and creating a map based on the scanned procedural language code, storing the map and the scanned procedural language code as metadata in a repository, creating a new set of target metadata containers for transformed representations of each component, processing at least a segment of the procedural language code using procedural metadata representations to create a first abstract syntax tree using the processed segment, populating the target metadata containers based on the first abstract syntax tree and generating an object-oriented metadata representation of the original procedural program having an object class based on the first abstract syntax tree. The method may further comprise suspending the step of processing a segment of the procedural language code when a predetermined segment of the procedural language code is detected and modifying another abstract syntax tree based on the predetermined segment. The method may further comprise creating a second abstract syntax tree based on the procedural language, wherein the second abstract syntax tree may be an abstract syntax tree having a node identifying a property of a statement of the procedural programming language. The step of creating the first abstract syntax tree may include locating a node in the second abstract syntax tree based on the processed segment, traversing the nodes second abstract syntax tree to a root node, and including the contents of the traversed nodes in the first abstract syntax tree.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 6 shows a representation of sample representation of an abstract syntax tree expressed as an XML document.

DETAILED DESCRIPTION

Figure 1:
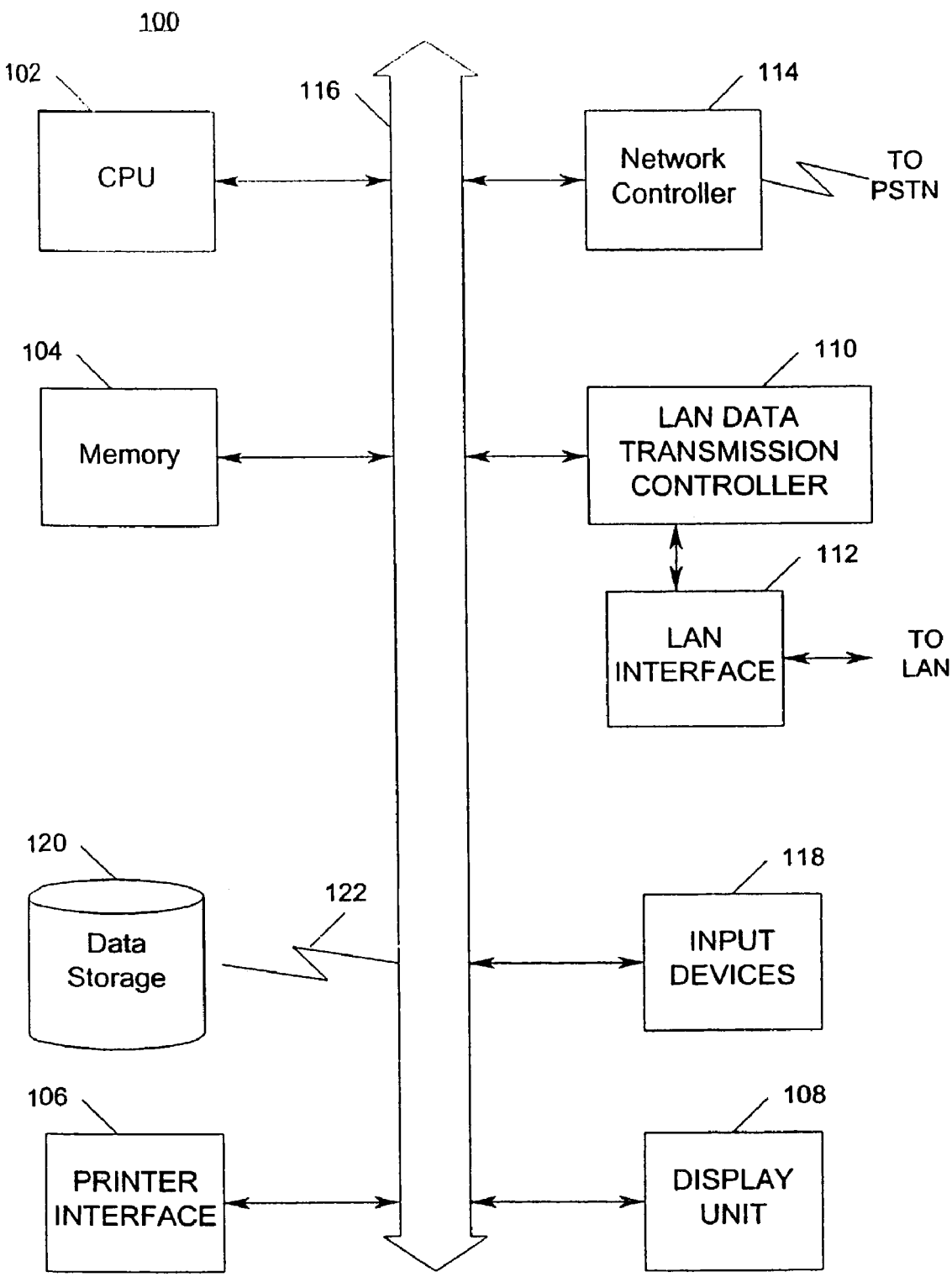
FIG. 1 shows an example of a computer system capable of implementing the method and system of the present disclosure.

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 shows an example of a computer system capable of implementing the method and system of the present disclosure. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system is referred to generally as system 100, and may include a central processing unit (CPU) 102, memory 104, for example, Random Access Memory (RAM), a printer interface 106, a display unit 108, a (LAN) local area network data transmission controller 110, a LAN interface 112, a network controller 114, an internal bus 116 and one or more input devices 118, for example, a keyboard, mouse etc. As shown, the system 100 may be connected to a data storage device, for example, a hard disk, 120, via a link 122.

The system and method of the present disclosure performs a transformation for transforming legacy applications into modern, object-orientated, N-tier applications that use a graphical user interface. This may include processes for analyzing the legacy application program code, creating classes and their methods based on the legacy code, as well as creating a graphical user interface based on the legacy code. Under certain circumstances, conversion of some segments of legacy code may not be desirable, in which case the process may transfer the original code or may substitute new code.

Figure 2:
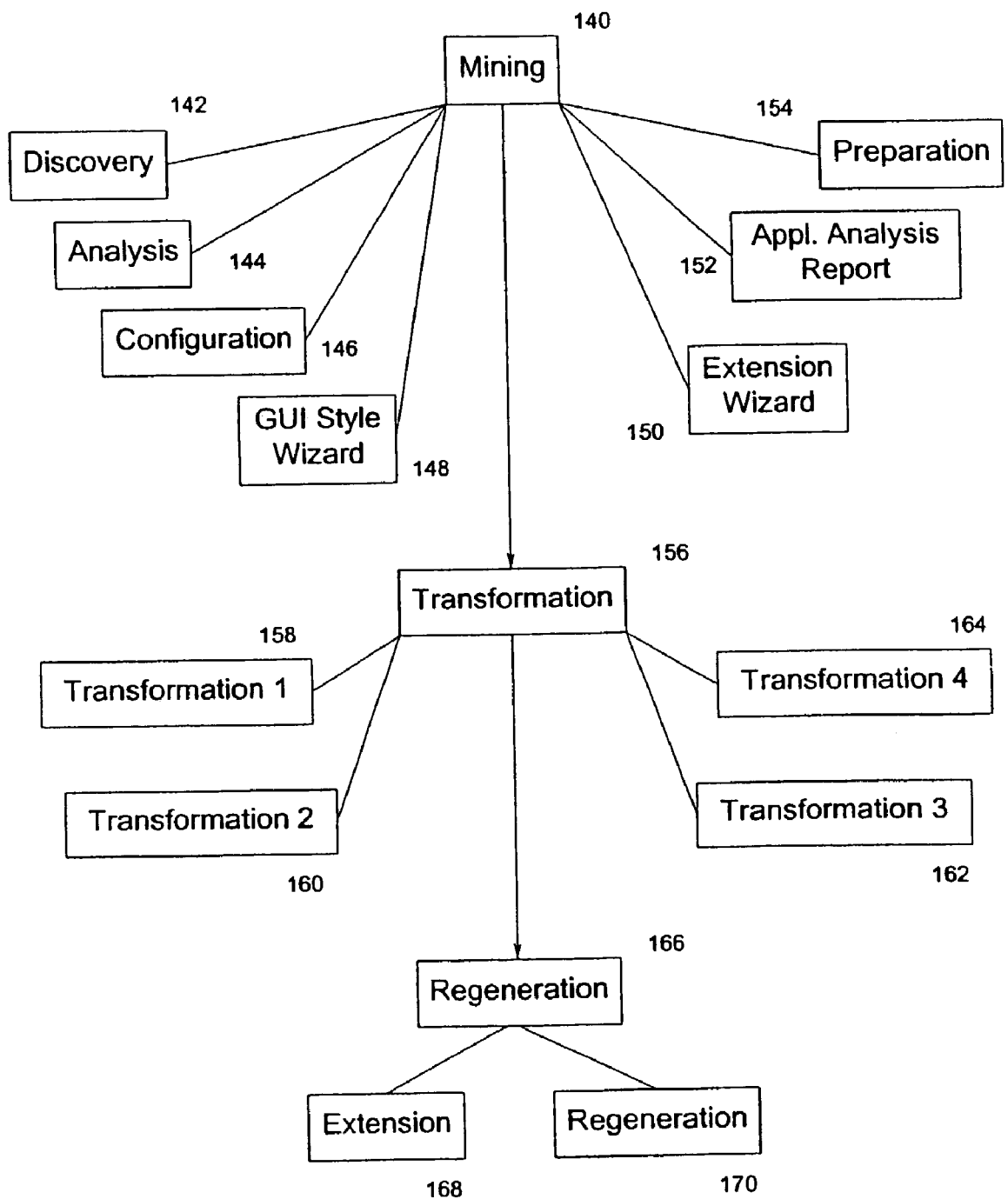
FIG. 2 shows an example of a process chart according to an embodiment of the present disclosure.

FIG. 2 shows an example of a process chart according to an embodiment of the present disclosure. In one embodiment, the transformation begins with a mining process 140 which may involve discovery 142, analysis 144, configuration 146, GUI Style Wizard 148, Extension Wizard 150, Application Analysis Report 152, and Preparation 154 and other steps required to collect all resources required from the legacy software application and prepare them for transformation. Once stored in the meta-format, the meta-components may be operated upon by a transformation process 156 and transformation 1-transformation 4 158-164, where the meta-components may be processed, reorganized and enhanced. During this transformation process, the legacy meta-components are transformed into object meta-components. Finally, during a regeneration process 166, in the extension step 168, libraries are built based on results from the mining process 140, and in the regeneration step 170, the object meta-components are implemented as actual object classes in a specific, object-orientated language.

Separating the transformation system of the present disclosure into multiple processes as described above provides several additional features of the present disclosure. A first feature is the creation of a "from anywhere/to anywhere" transformation. This is because the makeup of the meta-components may be defined by the transformation system. For example, in order to transform a particular legacy software application, a mining process 140 capable of storing the legacy components as meta-components in the repository may be provided. In order to transform a legacy language software application into a particular object language, a transformation process 156 and a regeneration process 166 capable of creating object classes in the desired object language from the object meta-components may also be provided. A second feature is that additional new steps may be added to the processes of the transformation system when it is desired to alter the outcome of the transformation.

For instance, in order to customize a particular transformation methodology it is possible to add "customization" steps to processes. These customization steps are able to perform changes to any or all of the components before or after one of the other steps in the transformation system is performed. Such customization steps can be used to add to, delete from or alter a component. For example, it may be desirable to remove a particular field from one or more forms, add a different field or other resource (such as an icon) to the corresponding GUI and then make a change to the related object code. There are many other features that are possible because of this infrastructure.

Another aspect of the method according to the present disclosure is that it may be made restartable from any step or process and any component within the legacy software application. If, for instance, a power failure occurs during any part of the processing, the transformation system and method may be restarted from the step and component that was being processed when the power failure occurred. To achieve this feature it may be desirable that the repository selected be a persistent storage facility (e.g., a database repository).

An exemplary embodiment of the mining, transformation and regeneration processes is described in more detail below.

Mining Process

The mining process 140 discovers the resources required for a transformation, stores them in the repository and prepares them and any other meta-component required for the transformation. Preferably, the mining process 140 has the ability to report any deficiencies found in the legacy software application that would prevent a complete transformation. These deficiencies are most commonly missing components such as a source code or form definitions. The mining process 140 may also provides for operator input which may be used when the mining process 140 encounters capabilities of the legacy development environment for which there is either no known transformation or for which the transformation system has not yet been programmed to handle. This provides the opportunity for the operator to correct any deficiencies in or to enhance the transformation system before the remainder of the processes are run.

The following steps are examples of steps that may be performed by the mining process 140. Each step described may or may not be utilized for a particular transformation methodology. Further, each transformation methodology can be provided with a set of configuration values which alter the output generated by the process. For instance, a specific configuration value could cause the resulting components to be renamed based on a specific pattern. Each configuration value may have a default setting which can be overridden by the operator.

Discovery

The discovery step 142 queries the legacy software development environment and develops a catalog of components contained in a particular application. The discovery step may scan appropriate logical memory, for example, physical memory blocks and virtual memory pages, according to the operating system present on the computer scanned. The components scanned may include, but are not limited to, the source code, form definition, application structure, the schema of any related database, forms, frames, procedures, record definitions, global variables, constants, host routines, etc. These components are preferably stored as meta-components in the repository. In addition, for source code components, the source code may be "tokenized" or broken down into a stream of basic programming symbols. Copies of these components are then stored as meta-components in a "repository" where they may be retrieved, modified and saved repeatedly. This repository may be a memory cache, a file system, a database or any other suitable information storage facility.

Analysis

In the analysis step 144, all of the information of a meta-component is analyzed and a map is created for each component. The map contains information on where each routine and section within a routine starts and stops within the token stream. In addition, metrics concerning each component may be used to create an Application Analysis Report 152.

Validation

During the validation phase, a cross-reference of all components in the legacy application is generated. This cross-reference provides a list of every component (module, data source, form, etc.) that is referenced by a component. Then, the repository is checked to ensure that all of the components of the legacy environment have been stored in the repository. If any components are found to be missing, the operator is notified to allow the deficiency to be addressed. The process can continue with unreferenced components but the components which reference them will not be completely transformed.

Configuration

During the configuration step 146, the information from the analysis step 144 is used to establish the initial configuration. This configuration is stored in the meta-component which describes the legacy application itself. This meta-component controls the transformation process 156. Some of these parameters may be modified during the validation phase.

GUI Style Wizard

The GUI Style Wizard 148 provides an operator with the ability to customize the resulting graphical user interface by overriding its default specifications. The wizard creates a custom menu bar, toolbar and button bar definitions are applied to all graphical forms to provide a consistent look and feel in the resulting application.

Extension Wizard

The Extension Wizard 150 provides the operator with an opportunity to direct the transformation process 156 to create a new foundation class library, business object library and front-end library for the application. These new object libraries are built on the schema specifications found in the legacy software application and can radically reduce the time required to develop new features and functions in the new application. If this step is not run, the transformation will not create these libraries.

Application Analysis Report

Preferably the application analysis report 152 is a comprehensive report on the entire legacy infrastructure, and includes a cross-reference of all resources and detailed information and metrics on each component. It may also provide a listing of problem areas as described above. The metrics include: the kind and total number of components in the legacy application, total lines of source code, the number and definition of routines that make up each module, a compilation of all commands presented by the application, etc.

Preparation During the preparation step 154, all additional target OO meta-components which will be used for the transformation are created in the repository. If the meta-components exist in the repository from a prior run of the transformation process, they are destroyed and new meta-components are created.

Transformation Process

The transformation process 156 provides a mechanism by which the legacy meta-components now stored in the repository are manipulated to create the object meta-components. The transformation process 156 performs a transformation in which the entire legacy application may be transformed in a multi-stage, parallel process. In the transformation process 156, any particular source statement (in the instance of code), or form part, or any other portion of a component of the legacy software application can potentially trigger a rule which causes one or more components (or procedures) to be modified in some way. For instance, during the transformation of a "frame" (a frame is a procedure which requires a user interface and has an associated form), the transformation process 156 may discover a parameter. That parameter becomes an attribute of the object class being created to replace the frame. Processing of the frame is suspended, the object class is retrieved from the repository, the attribute is added to the object class, the object class is returned to the repository and processing of the source is resumed. Likewise, in the processing of the frame's form definition, if a field is encountered on the form, an attribute is added to the same object class in a like manner. There are many other more complex transactions in the process which may move entire blocks of code from one component (or procedure) to another depending on the conditions.

In order to facilitate the parallel processing discussed above, a temporary storage facility having the capability to manage intermediate representations of components from both the legacy software application, the new application and an intermediate application (or "meta-application") should be provided. The meta-application is convenient because rather than being tied to a specific implementation of any particular software development environment, it contains constructs which are found in any of these environments. By manipulating "meta-components," the process of transforming the legacy software application into the new application can be separated into three distinct processes: mining, transformation and regeneration.

One embodiment of the transformation process 156 will be described below as four transformations.

Transformation 1

The transformation 1 engine 158 is responsible for disassembling the legacy source code and organizing it into a structured format that can be easily manipulated. The source code for the components is disassembled using the maps created during the analysis step as a guide. Each parameter and variable declaration and each source statement is decomposed, organized and translated into an internal format. This can be accomplished in a number of ways. One way is to decompose the legacy source code for a component into a property tree data structure. A property tree is a hierarchical structure that provides for the storage of an unlimited number of identifiers or properties at any node in the tree. This decomposition is accomplished using several steps.

Figure 3:
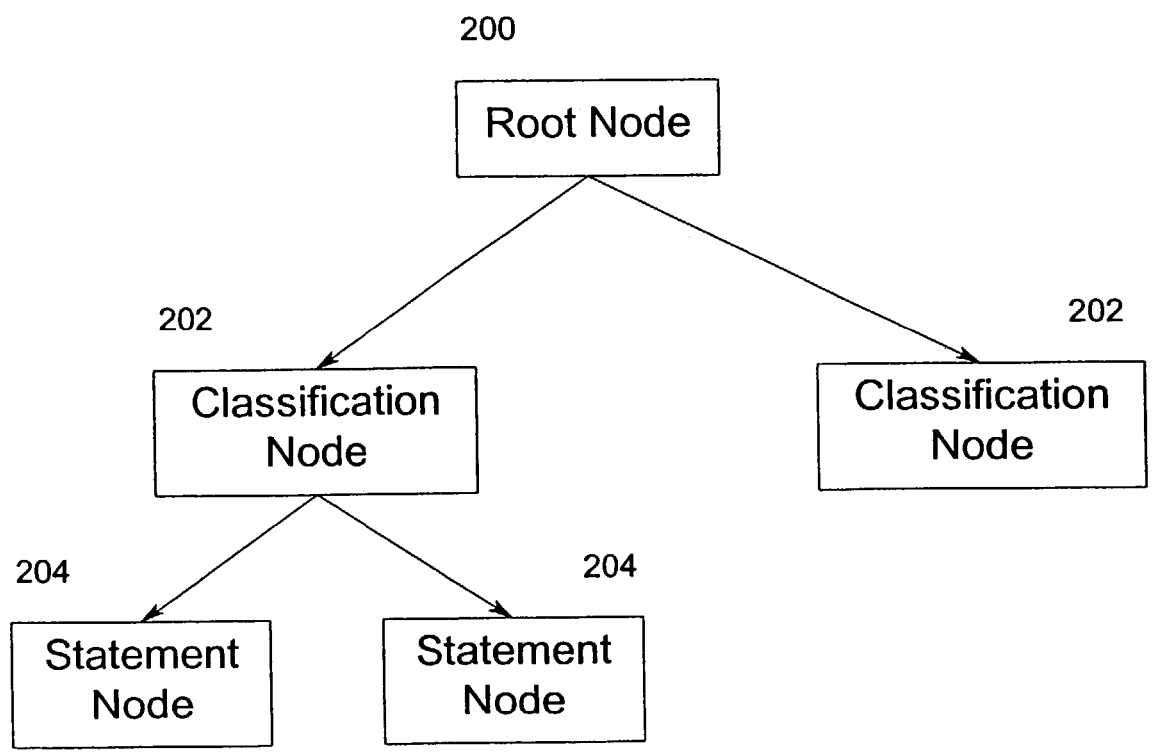
FIG. 3 shows an example format of a legacy language statement grammar tree according to an embodiment of the present disclosure.

The first step is to develop a grammar representation of the legacy programming language in the form of a hierarchical property tree. Prior to transformation, a legacy programming language grammar, an example of which is shown in FIG. 3, is created which represents the characteristics of the legacy programming language. Each different type of statement the legacy language supports is identified in the legacy language (e.g., FOR-ENDFOR, CALL, PROMPT, etc.). The statements are grouped into a hierarchy by grouping statements of a common type. For instance, FOR-ENDFOR and WHILE-ENDWHILE are considered "loop controls". A single root node 200 is created for the property tree. At the root node 200, properties are created in the tree which are common to all statements. For instance, "Line Number" may be a property common to all statements. Below the root node, classification nodes 202 are created in the tree which represent the hierarchy developed for the statements above. At each classification node 202, properties are implemented which are common to those statements. For instance, "Loop Counter" might be a common attribute of all loop controls. Finally, statement nodes 204 are created in the appropriate classification node 202 that represent each specific statement. Properties are created for that node which are unique to the statement. In this method, at least one common property should be defined at each statement node 204 with a default value that is unique to the statement: the statement type.

Figure 4:
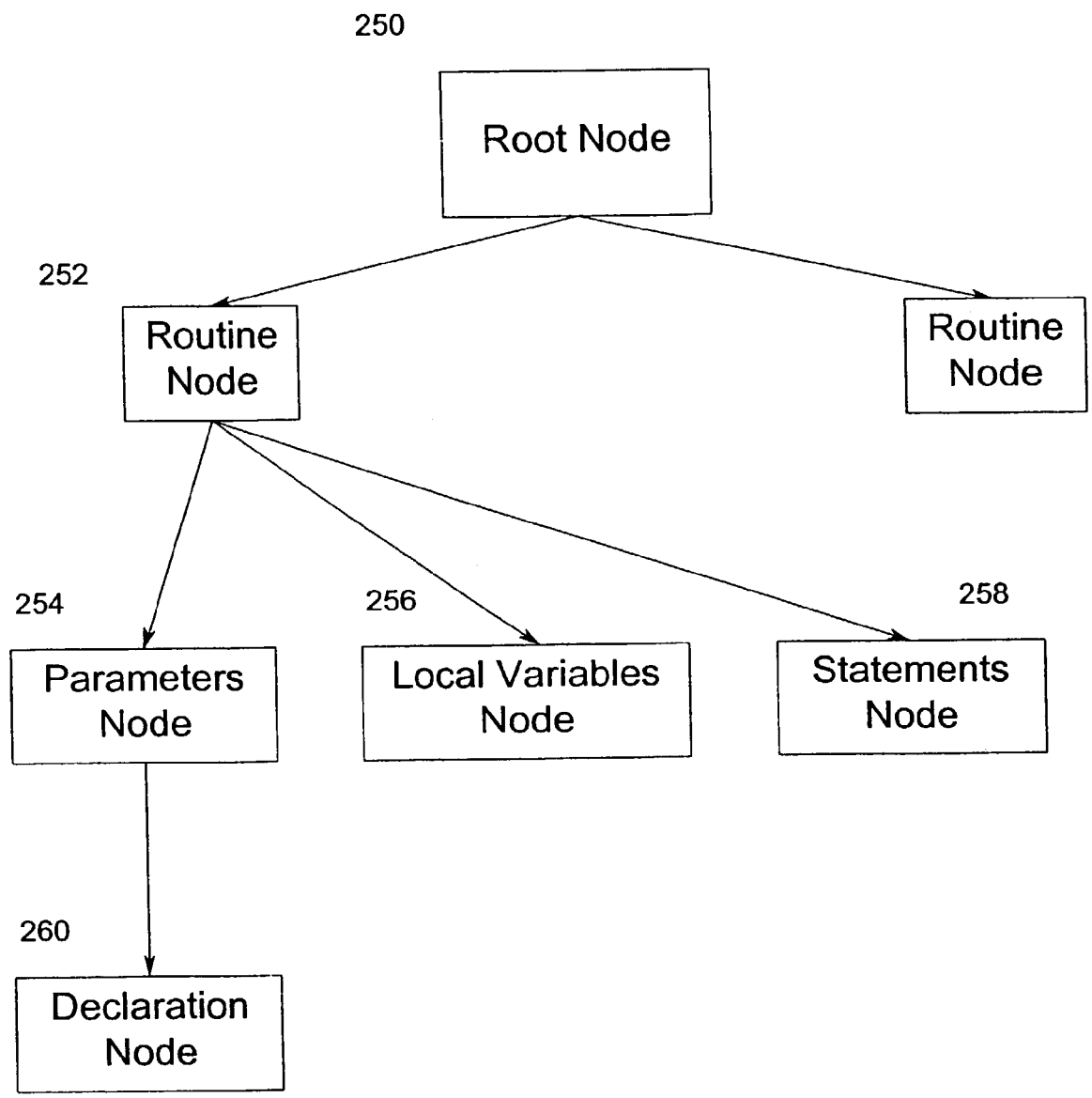
FIG. 4 shows an example format of a abstract syntax tree according to an embodiment of the present disclosure.

During transformation 1 158, another type of tree, known as an abstract syntax tree, is developed for each component. An abstract syntax tree is a specialized version of a hierarchical property tree designed to contain fully decomposed source code. An example of an abstract syntax tree is shown in FIG. 4A root node 250 is created and properties are defined at the root node 250 which identify the component as a whole. Routine nodes 252 are created for each block of code that exists within the component. Classification nodes (not shown) which hold different types of code blocks can be created if this offers an advantage to the regeneration process 166 (discussed later in this document). Each routine node 252 has defined parameters which identify the routine. Section nodes 254, 256, and 258 are created below the routine node 252 and identify the different sections of the routine. The following three section types are typical: parameters node 254, local variables node 256 and statements node 258.

The transformation 1 158 also uses the map created during the analysis step 144 of the mining process 140. The map contains information on where each routine and section within a routine starts and stops within the token stream. Beginning at the first token for the parameter section of the code, transformation 1 158 processes tokens until it finds a complete declaration statement. It then adds a declaration node 260 to the parameter section node 254. At that node, it defines properties which completely define the variable which is being declared as a parameter. This is repeated for the local variable and statement section. Once transformation 1 158 identifies the statement type, it locates the node in the legacy language grammar tree shown in FIG. 3 which represents that statement. It traverses up the tree copying all of the properties which define the statement or are a property of any classification node up to and including the root node. Those properties are then defined in the statement node of the components property tree. Transformation 1 158 then parses the statement and replaces the default values of each property with the exact values found in the statement.

Figure 6:
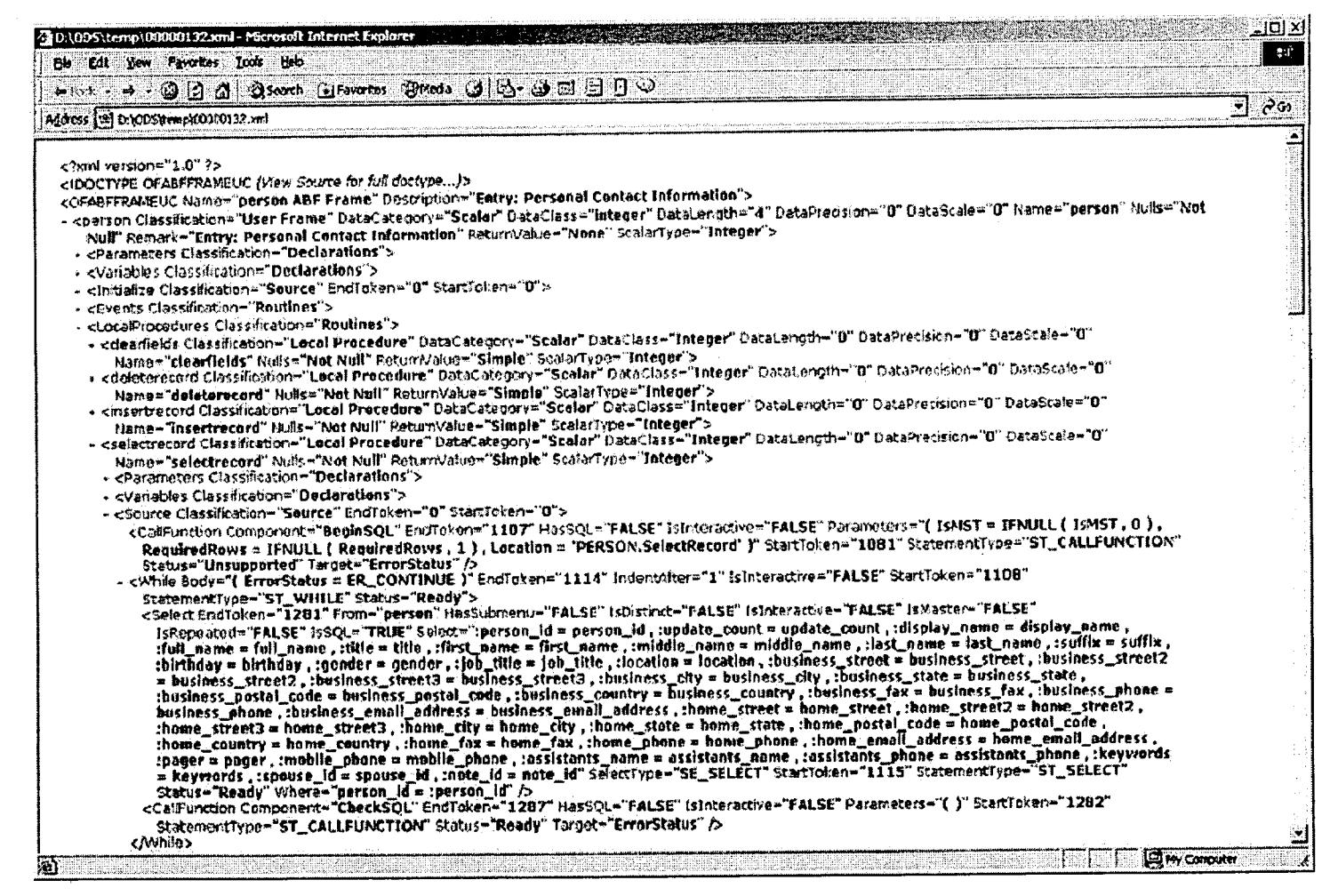

In addition, transformation 1 158 maintains relationships between statements. For instance, any statement found after a FOR statement and before the corresponding ENDFOR would be created as a child node of the FOR statement node. This nesting can continue as deep as is necessary. Nesting the code in this manner makes it easy to move entire code blocks later during the transformation. Once this process is completed, a complete, organized version of the legacy source code has been created and can now be acted upon. A sample visualization of an abstract syntax tree expressed as an XML document is shown in FIG. 6.

Transformation 2

The transformation 2 engine 160 is responsible for converting the legacy forms into object meta-components which can be used to create a graphical interface during regeneration. This can be accomplished in a manner similar to the way the legacy source code was manipulated in transformation 1 158. This process, uses two reference property trees, a Graphical Interface Form Template tree, and an OO class hierarchy tree.

The Graphical Interface Form Template tree contains a representation of an empty graphical interface form. The root node for this form contains a description of the basic characteristics of the form. The property tree would comprise three root nodes. The first root node would contain the properties which describes the "window." A window is an area for displaying information on a graphical user interface. The second root node contains a placeholder for the menu bar. A menu bar is a special area usually placed at the top of a window which allows the user to select from a series of commands. The third root node contains child nodes which describe the contents of the window itself. In order to create a more efficient process, a default configuration for the window contents should be supplied in the property tree. The OO class hierarchy tree describes the class hierarchy of the target object orientated software development environment. This property tree is created substantially similar to the Legacy Language Grammar Tree. Every OO model software development environment has a "system" or built-class hierarchy. This class hierarchy defines the foundation class objects which make up the development environment. The OO class hierarchy tree is created by implementing a property tree which describes each attribute of each class in the hierarchy.

Figure 5:
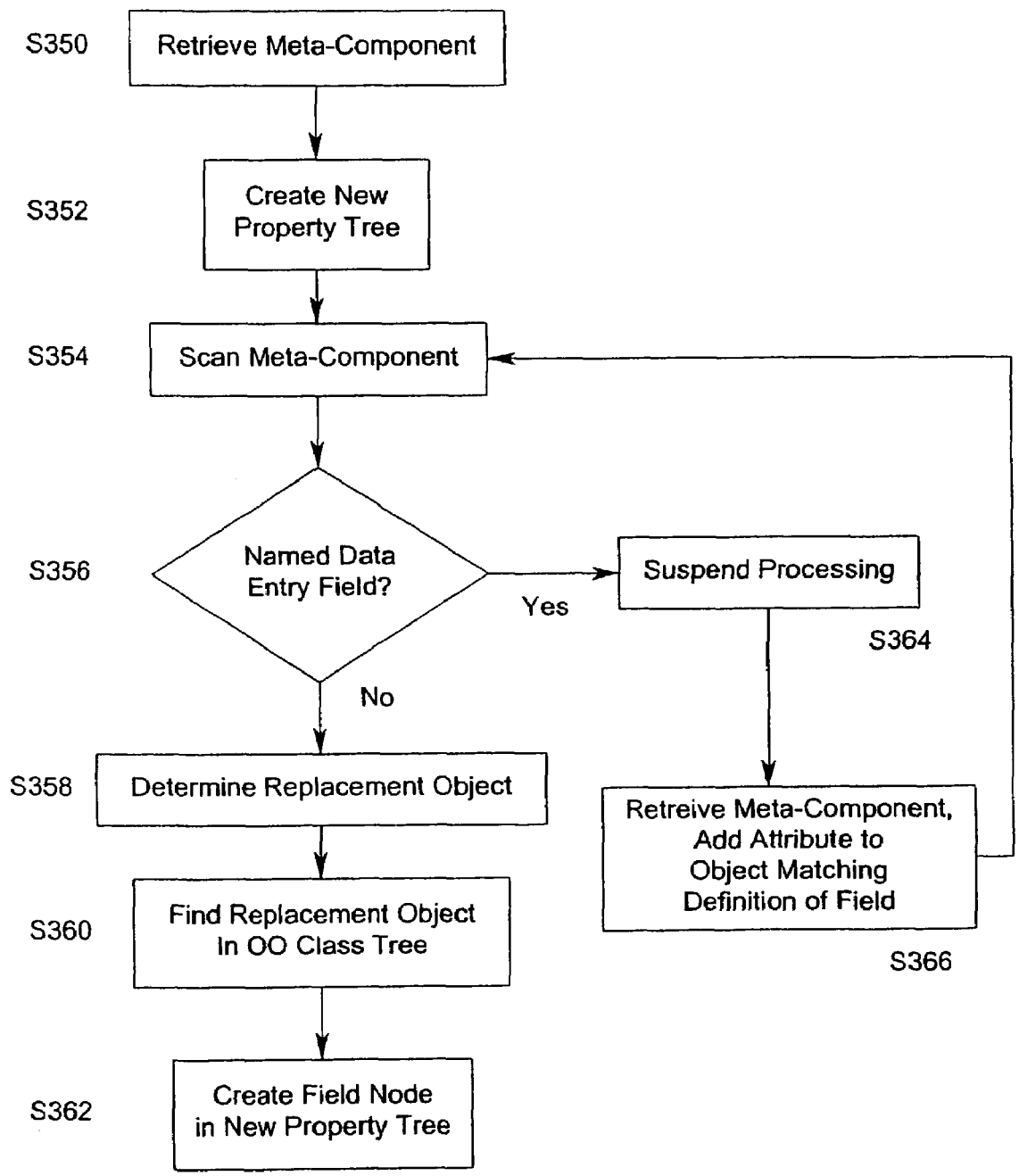
FIG. 5 shows a flowchart of a process according to an embodiment of the present disclosure.

Referring to FIG. 5, transformation 2 160 retrieves a meta-component from the repository representing a legacy form (Step S350). A new property tree is created which will represent the graphical interface form replacement for the legacy form (Step S352). This is accomplished by first copying the Graphical Interface Form Template. Transformation 2 160 scans the meta-component (Step S354) and, if the code scanned is not a named data entry field (No, Step S356), then, for each item on the legacy character form (field, trim, etc.), transformation 2 160 decides what replacement object will be placed on the graphical form (Step S358). Once this decision is made, the process can look up the object class in the OO class hierarchy tree and collect all its properties by traversing the tree all the way up to the root node and collecting properties along the way (Step S360). Then, a field node is created in the form section of the abstract syntax tree and the copied properties are defined at that node with the default values replaced by those read from the legacy form (Step S362). Once all items on the legacy form have been processed, what remains is a complete description of a graphical interface.

Two other processes my be implemented during the creation of the graphical interface. First, when a named data entry field is encountered on the legacy form (Yes, Step S356), processing of the form is suspended (Step S364) while the meta component for the object class which will replace the source code associated with the form is retrieved and an attribute is added to the object which matches the definition of the field (Step S366). This is done because in many legacy software development environments, fields on forms are implicitly declared variables in the form's source code. In the OO model, they became declared attributes of the object. Second, after processing the legacy form, the process scans the abstract syntax tree created in transformation 1 158 for the form's source code. Specifically, the process looks for user commands found in the legacy source. If any are found, any one of several GUI controls (buttons, toolbar icons, or menubar commands) may be created on the graphical user interface property tree based on input from a GUI Style Wizard. Then, one or more "events," are added to the abstract syntax tree that represents the new code logic for the form. These added "events" will associate the new GUI form controls with the method that was generated in the object class that is the transformed representation of the logic associated with the menu command in the legacy application.

Transformation 3

In transformation 3 162, the abstract syntax tree for each legacy source code component is retrieved from the repository. The corresponding object meta component is retrieved as well. For every routine node in the abstract syntax tree, a "method" node is created in the object meta component. A method is the source code in an object that can act upon the object. Transformation 3 162 first takes any parameters of the routine and declares them as parameters of the method.

The same is done with local variables. The statements are then processed. For each legacy statement type, transformation 3 162 decides how to convert the statement and where to put it. In many instances, the engine may decide to completely move an entire routine or subset of a routine to a completely different object. This happens when a feature of the legacy software development language is not easily translated into the new software development environment.

Another part of transformation 3 162 is transforming the procedural context of the legacy software application into an object context. This has two aspects. First, in a procedural environment, one component invokes another by "calling" it. In the OO model, rather than calling a procedure, an instance (or copy) of an object is created and one of its methods is invoked. Whenever transformation 3 162 encounters some kind of legacy call statement, it suspends processing, retrieves the object meta component which defines the called object, and validates the parameters to the call. In some instances the object may require adjustments. Then, in the calling component, the call statement is replaced with several different statements. The first statement is to an Object Request Broker (ORB). An ORB is a special object whose job is to manage the creation of other objects based on a request. The next statement added is a call to a special method common to all transformed components which "invokes" or starts the objects processing.

The second aspect of the transformation from a procedure to an object context is the syntactical difference between a procedural software development tool and a OO software development tool. During the processing of the statements, each token is checked to see if it is a reference to what has been transformed into an attribute of the class. If so, the appropriate changes are made to the source so the appropriate variable is referenced.

Transformation 4

Transformation 4 164 is the transformation in this exemplary embodiment. It involves the cleanup of a variety of small problems which can remain but may not be dealt with in parallel to all of the processing which is performed in transformation 3 162.

Regeneration Process

The regeneration process 166 is the reverse of the mining process 140. During the regeneration process 166, the object meta-components created during the transformation process 156 are used to create the actual object classes that are placed in the new software development environment. In addition, the new graphical interface forms and any other necessary components are created and placed in the new software development environment.

Extension

The extension step 168 builds the new Foundation Class Library, Business Object Library and Front-End Component library as specified by the Extension Wizard run during the mining process 140.

Regeneration

In regeneration step 170, actual object classes and GUI forms are generated from the object meta-components according to the specifications contained therein.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for transforming a procedural program having procedural language code into an object-oriented program, comprising:
    scanning the procedural language code of the procedural program to discover one or more components of the procedural program;
    creating and storing a map based on the scanned procedural language code and the discovered one or more components of the procedural program;
    storing the one or more components of the procedural program as first intermediate code comprising, for each of the one or more components of the procedural program, a corresponding meta-component;
    processing at least a segment of the procedural language code for a particular component using the map;
    creating a first data structure using the processed segment;
    modifying second intermediate code for a target object based on the first data structure; and
    generating an object-oriented program having an object class based on the modified second intermediate code for the target object;
    wherein the method further comprises:
        suspending the step of processing a segment of the procedural language code when a predetermined segment of the procedural language code is detected; and
        modifying another intermediate code based on the predetermined segment.

2. The method of claim 1, further comprising creating a second data structure based on the procedural language of the procedural language code, wherein the second data structure comprises a hierarchical tree comprising a node identifying a property of a statement of the procedural language of the procedural language code.

3. The method of claim 2, wherein creating the first data structure comprises:
    locating a node in the second data structure based on the processed segment;
    traversing one or more nodes of the second data structure from the located node to a root node; and
    including the contents of the traversed one or more nodes in the first data structure.

4. Software for transforming a procedural program having procedural language code into an object-oriented program, the software being embodied in a computer-readable storage medium and when executed operable to:
    scan the procedural language code of the procedural program to discover one or more components of the procedural program;
    creating and storing a map based on the scanned procedural language code and the discovered one or more components of the procedural program;
    store the one or more components of procedural program as first intermediate code comprising, for each of the one or more components of the procedural program, a corresponding meta-component;
    process at least a segment of the procedural language code for a particular component using the map;
    create a first data structure using the processed segment;
    modify second intermediate code based for a target object on the first data structure; and
    generate an object-oriented program having an object class based on the modified second intermediate code for the target object;
    wherein the software when executed is further operable to:
        suspend processing a segment of the procedural language code when a predetermined segment of the procedural language code is detected; and
        modify another intermediate code based on the predetermined segment.

5. The software of claim 4, further operable to create a second data structure based on the procedural language of the procedural language code, wherein the second data structure comprises a hierarchical tree comprising a node identifying a property of a statement of the procedural language of the procedural language code.

6. The software of claim 5, wherein creating the first data structure comprises:
    locating a node in the second data structure based on the processed segment;
    traversing one or more nodes of the second data structure from the located node to a root node; and
    including the contents of the traversed one or more nodes in the first data structure.

7. A method for transforming a procedural program having procedural language code into an object-oriented program, comprising:
    scanning the procedural language code of the procedural program to discover one or more components of the procedural program;
    creating a map based on the scanned procedural language code and the discovered one or more components of the procedural program;
    storing the map and the one or more components as procedural language metadata representations in a repository, each of the one or more components associated with a corresponding portion of the scanned procedural language code;
    creating a new set of target metadata containers for transformed representations of each of the one or more components;
    processing at least a segment of the procedural language code of the one or more components using the procedural language metadata representations of the one or more components and a grammar representation of the procedural language of the procedural language code to create a first abstract syntax tree based on the processed segment;

populating the target metadata containers based on the first abstract syntax tree; and generating an object-oriented metadata representation of the original procedural program having an object class based on the first abstract syntax tree;

wherein the method further comprises:

suspending the step of processing a segment of the procedural language code when a predetermined segment of the procedural language code is detected; and modifying another abstract syntax tree based on the predetermined segment.

8. The method of claim 7, further comprising creating a second abstract syntax tree based on the procedural language of the procedural language code, wherein the second abstract syntax tree comprises an abstract syntax tree comprising a node identifying a property of a statement of the procedural language of the procedural language code.

9. The method of claim 8, wherein creating the first abstract syntax tree comprises:

locating a node in the second abstract syntax tree based on the processed segment;

traversing one or more nodes of the second abstract syntax tree from the located node to a root node; and including the contents of the traversed one or more nodes in the first abstract syntax tree.

\* \* \* \* \*